No. 820,239. PATENTED MAY 8, 1906.
A. L. MOSS.
VALVE.
APPLICATION FILED FEB. 6, 1906.
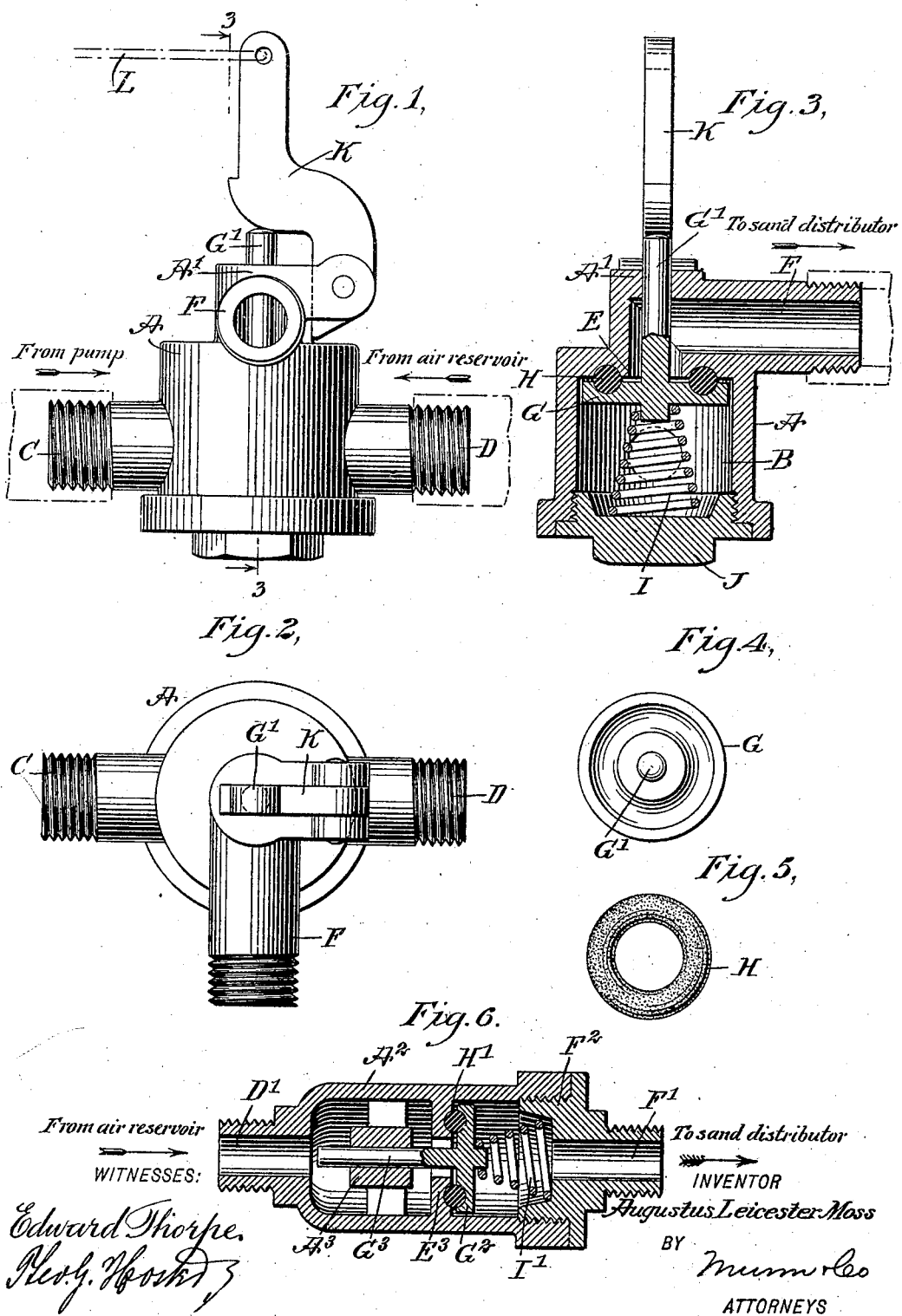
WITNESSES:
Edward Thorpe.
Rev. G. Hook
INVENTOR
Augustus Leicester Moss
BY Munn & Co
ATTORNEYS

UNITED STATES PATENT OFFICE.

AUGUSTUS LEICESTER MOSS, OF SANDUSKY, OHIO.

VALVE.

No. 820,239.　　　Specification of Letters Patent.　　　Patented May 8, 1906.

Application filed February 6, 1906. Serial No. 299,715.

*To all whom it may concern:*

Be it known that I, AUGUSTUS LEICESTER MOSS, a citizen of the United States, and a resident of Sandusky, in the county of Erie and State of Ohio, have invented a new and Improved Valve, of which the following is a full, clear, and exact description.

The object of the invention is to provide a new and improved valve, more especially designed as a controller-valve or check-valve, for controlling the passage of compressed air or other fluid and when closed being capable of holding a fluid-pressure, exceeding, say, sixty or seventy pounds, for a long period and without danger of leakage, thus rendering the valve exceedingly efficient for use in pneumatic sanding devices for automobiles and the like and such as shown and described in the Letters Patent of the United States, No. 807,186, granted to me December 12, 1905.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement arranged as a controller-valve for controlling the fluid-pressure from the air reservoir or pump to the sanding-distributer. Fig. 2 is a plan view of the same. Fig. 3 is a transverse section of the same on the line 3 3 of Fig. 1. Fig. 4 is a plan view of the valve proper. Fig. 5 is a like view of the rubber gasket for the valve, and Fig. 6 is a longitudinal central section of the improvement arranged as a check-valve between the air-reservoir and the sanding-distributer.

The valve-casing A (illustrated in Figs. 1, 2, and 3) is provided with a chamber B, provided at one side with an inlet C, connected with the air-compressor or air-pump, and on the other side of the said chamber is arranged an inlet D, connected with the air-reservoir charged with air from the pump by way of the said chamber B. A valve-seat E within the chamber B connects the latter with an outlet F, formed on the casing A and connected with the sand-distributer, and the said valve-seat E is adapted to be closed by a valve G, carrying on its valve-disk a rubber gasket H, seated at one face in an annular groove formed on the valve-disk and seated at its other opposite face in an annular groove formed in the wall of the valve-seat E.

The under side of the valve G is pressed on by a spring I, extending in the chamber B and resting on a plug J, screwing in the bottom of the chamber for closing the same. The spring I is sufficiently heavy to properly hold the gasket H firmly seated to prevent leakage of air from the chamber B by way of the valve-seat E into the outlet F, leading to the sand-distributer. The stem G' of the valve G extends through a suitable bearing A' on the casing A to the outside thereof, and the outer end of this valve-stem G' is engaged by a lever K, connected by a link L with a hand-lever or other means under the control of the operator for imparting a swinging motion to the lever K, so as to press the valve-stem G' to move the valve G off its seat whenever it is desired to establish communication between the chamber B and the outlet F, leading to the sand-distributer. As soon as the pressure on the hand-lever mentioned is released then the valve G is immediately seated by the action of the spring I to disconnect the chamber B from the outlet F.

In the modified form shown in Fig. 6 the valve-casing $A^2$ is provided at one end with an inlet D', connected with the air reservoir, pump, or like source of compressed-air supply, and the other end of the casing $A^2$ is provided with an outlet F', connected with the sand-distributer, the outlet F' being in the form of a plug $F^2$, screwing into the end of the casing $A^2$. A valve-seat E' extends transversely in the casing $A^2$ and on it is adapted to be seated a valve $G^2$, having a rubber gasket H' and pressed on by a spring I', held on the plug $F^2$. The stem $G^3$ of the valve $G^2$ is mounted to slide in a suitable guideway $A^3$, arranged within the casing $A^2$. By the arrangement described the valve $G^2$ is firmly held to its seat by the pressure of the spring I', and all leakage between the inlet D' and the outlet F' is prevented by the gasket H' being seated partly in an annular groove in the valve $G^2$ and partly in an annular groove in the valve-seat E', the same as above described, and shown in Fig. 3.

By the arrangement described undue leakage of air is prevented, so that a heavy pressure can be maintained in the air-reservoir for a long time without danger of leakage, thus rendering the valve exceedingly serviceable for pneumatic sanding devices, as above referred to.

Having thus described my invention, I claim as new and desire to secure by Letters Patent—

1. A valve comprising a valve-casing having an inlet for connection with a pressure-supply and an outlet for the discharge of the fluid-pressure, a valve-seat in the said valve-casing between the inlet and outlet, the said valve-seat having an opening and an annular groove, a bearing on the said valve-casing, a valve-disk having a stem engaging the said bearing, the said valve-disk having an annular groove registering with the said valve-seat groove, a rubber gasket fitting the said registering grooves, and a spring pressing the said valve-disk.

2. A controller-valve for pneumatic sanding devices, comprising a valve-casing having a chamber, inlets, of which one is connected with an air-compressor and the other with an air-reservoir, an outlet on the said valve-casing, a valve-seat between the said chamber and the said outlet, a valve proper within the said chamber and adapted to be seated on the said valve-seat, the stem of the valve extending to the outside of the said valve-casing, a spring within the said chamber and pressing the said valve proper to hold it to its seat, and manually-controlled means engaging the outer end of the said valve-stem for moving the valve off its seat against the tension of its spring.

3. A controller-valve for pneumatic sanding devices, comprising a valve-casing having a chamber, inlets, of which one is connected with an air-compressor and the other with an air-reservoir, an outlet on the said valve-casing, a valve-seat between the said chamber and the said outlet, a valve proper within the said chamber and adapted to be seated on the said valve-seat, the stem of the valve extending to the outside of the said valve-casing, a spring within the said chamber and pressing the said valve proper to hold it to its seat, a plug for closing the said chamber and supporting the said spring, and manually-controlled means engaging the outer end of the said valve-stem for moving the valve off its seat against the tension of its spring.

4. A controller-valve for pneumatic sanding devices, comprising a valve-casing having a chamber, inlets, of which one is connected with an air-compressor and the other with an air-reservoir, an outlet on the said valve-casing, a valve-seat between the said chamber and the said outlet, a valve proper within the said chamber and adapted to be seated on the said valve-seat, the stem of the valve extending to the outside of the said valve-casing, the said valve proper having a valve-disk and a rubber gasket fitting with one face into an annular groove in the valve-disk and fitting with the opposite face an annular recess in the said valve-seat, a spring within the said chamber and pressing the said valve proper to hold it to its seat, and manually-controlled means engaging the outer end of the said valve-stem for moving the valve off its seat against the tension of its spring.

In testimony whereof I have signed my name to this specification in the presence of two subscribing witnesses.

AUGUSTUS LEICESTER MOSS.

Witnesses:
 MAYE A. WONNELL,
 CORA L. WONNELL.